US012592159B1

(12) United States Patent
Taicher

(10) Patent No.: US 12,592,159 B1
(45) Date of Patent: Mar. 31, 2026

(54) SYSTEMS AND METHODS FOR IMPLEMENTING AN EDUCATIONAL PLATFORM USING ARTIFICIAL INTELLIGENCE

(71) Applicant: Christopher Lee Taicher, Ojai, CA (US)

(72) Inventor: Christopher Lee Taicher, Ojai, CA (US)

( * ) Notice: Subject to any disclaimer, the term of this patent is extended or adjusted under 35 U.S.C. 154(b) by 0 days.

(21) Appl. No.: 19/088,840

(22) Filed: Mar. 24, 2025

(51) Int. Cl.
*G09B 7/00* (2006.01)
*G06F 40/279* (2020.01)

(52) U.S. Cl.
CPC ............. *G09B 7/00* (2013.01); *G06F 40/279* (2020.01)

(58) Field of Classification Search
None
See application file for complete search history.

(56) References Cited

U.S. PATENT DOCUMENTS

2017/0270811 A1* 9/2017 Colar ...................... G09B 7/04

* cited by examiner

*Primary Examiner* — James B Hull
(74) *Attorney, Agent, or Firm* — Fish & Richardson P.C.

(57) ABSTRACT

Methods, systems, and apparatus for providing an educational computer application to a user. The techniques include providing a plurality of quiz objects, each quiz object including a question prompt belonging to one of a plurality of subject areas. The techniques also include receiving one or more actions on one or more quiz objects of the plurality of quiz objects. The techniques further include responsive to the one or more actions, identifying a set of quiz objects from the plurality of quiz objects for which a respective action is an incorrect response. The techniques also include extracting, using a natural language processor, keywords from question prompts for at least one quiz object of the set of quiz objects; retrieving, from one or more media interfaces, information on media related to the keywords; and providing, on the user interface of the user device, the information on the media related to the keywords.

27 Claims, 8 Drawing Sheets

402 — Question ID
404 — User Answer
406 — Subject Area
408 — Correct/Incorrect

400

302 — Question Prompt
304 — Set of Answers
306 — Explanations
308 — Citations
310 — Media
312 — Level of Difficulty
314 — Subject Identifer

300

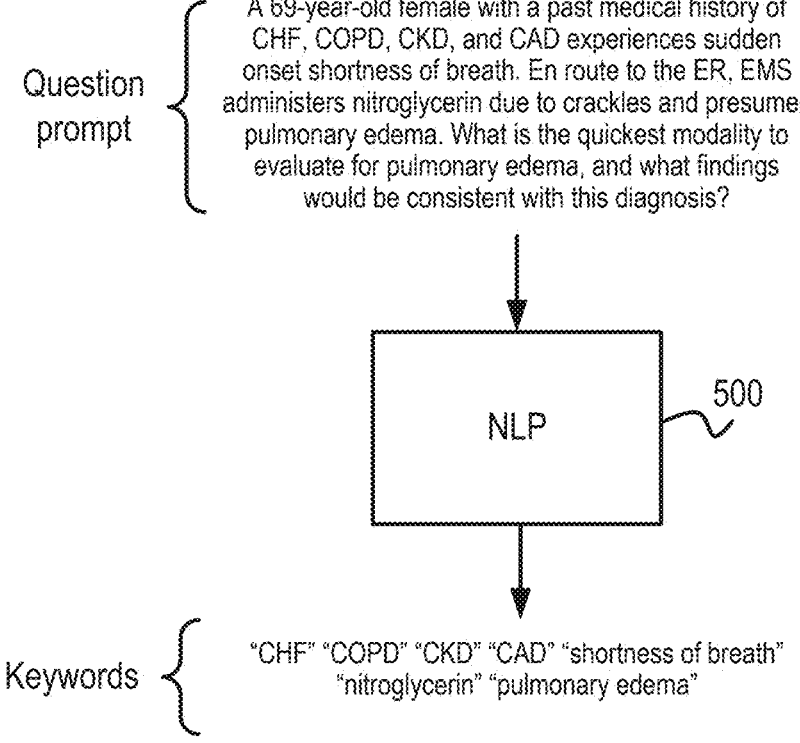

Question prompt {
A 69-year-old female with a past medical history of CHF, COPD, CKD, and CAD experiences sudden onset shortness of breath. En route to the ER, EMS administers nitroglycerin due to crackles and presumed pulmonary edema. What is the quickest modality to evaluate for pulmonary edema, and what findings would be consistent with this diagnosis?

NLP 500

Keywords {
"CHF" "COPD" "CKD" "CAD" "shortness of breath" "nitroglycerin" "pulmonary edema"

Figure 5

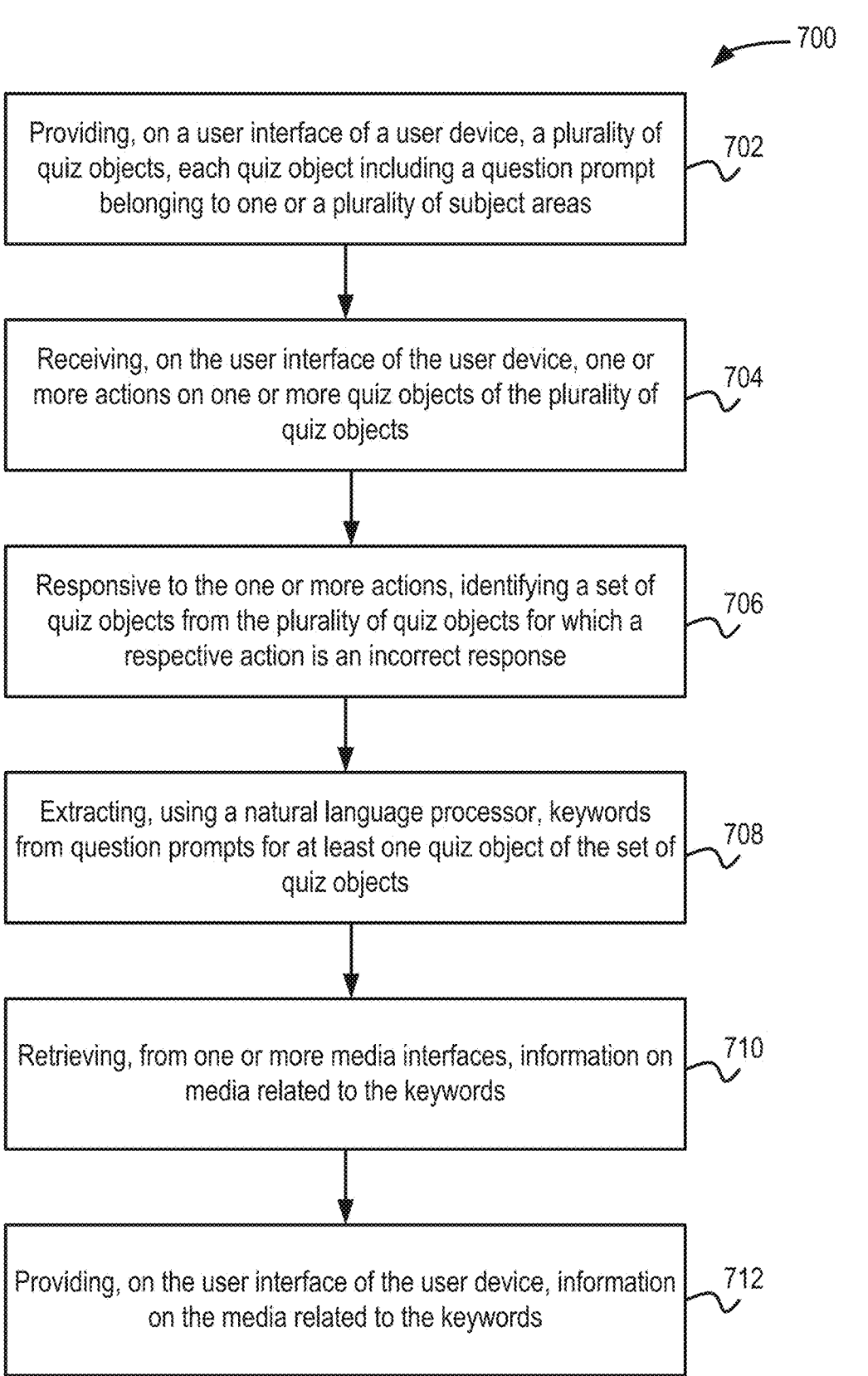

700

Providing, on a user interface of a user device, a plurality of quiz objects, each quiz object including a question prompt belonging to one or a plurality of subject areas

702

Receiving, on the user interface of the user device, one or more actions on one or more quiz objects of the plurality of quiz objects

704

Responsive to the one or more actions, identifying a set of quiz objects from the plurality of quiz objects for which a respective action is an incorrect response

706

Extracting, using a natural language processor, keywords from question prompts for at least one quiz object of the set of quiz objects

708

Retrieving, from one or more media interfaces, information on media related to the keywords

710

Providing, on the user interface of the user device, information on the media related to the keywords

SYSTEMS AND METHODS FOR IMPLEMENTING AN EDUCATIONAL PLATFORM USING ARTIFICIAL INTELLIGENCE

TECHNICAL FIELD

This specification relates to educational platforms, and more particularly to systems and methods for educational applications that utilize natural language processing.

BACKGROUND

In numerous education fields, especially medicine, there is a breadth of knowledge required to practice at high levels of competency. While educational institutions can aid in educating practitioners in a field, it can be challenging to teach a consistent curriculum that covers the lexicon of novel developments in the field accurately. Additionally, the educational institutions find it challenging to provide an educational platform that can accommodate practitioners with a varying knowledge base and knowledge gaps.

Some computer applications provide a personalized learning platform that can be tailored to an individual practitioner. However, these computer applications may suffer from inefficiencies and inaccuracies.

SUMMARY

This specification describes techniques for providing an efficient and accurate educational application that can be personalized to the user. In particular, a quiz app is described that utilizes natural language processing for identifying knowledge gaps in the user's knowledge and using keywords extracted by the natural language processor to search and retrieve media that is relevant to the knowledge gap of the user. The quiz app can be installed on a user device and can include a user interface that provides the user with one or more quiz objects, each of which includes a question prompt. The user can enter answers in relation to the question prompts. The quiz app can use a natural language processor that can identify keywords from the quiz objects for which the user answered incorrectly. The quiz app can search and retrieve media from one or more media sources, where the media can include videos, articles, images, etc.

Traditional approaches to searching media related to question prompts include tagging each question prompt with one or more keywords. These keywords are manually generated and stored with the question prompt. For a question bank with hundreds or thousands of question prompts, the storage of the keywords with the question prompts can use up critical storage resources. The techniques discussed herein alleviate this problem by using a natural language processor to generate the keywords dynamically from the question prompts. In particular, the techniques discussed herein use a natural language processor to extract keywords from the question prompts prior to carrying out the search. This technique alleviates the need to tag each question prompt with manually generated keywords and the need to store the keywords along with the question prompts. As a result, crucial storage resources which otherwise would have been used to store keywords, can alternatively be used for storing other data. In addition, the storage footprint of the question bank can be reduced. This is of particular importance where the question bank may be locally stored in mobile devices of the user where storage resources can be limited. Even where the question bank is stored in a remote network location, the reduction in the size of the question bank can improve the latency with which the questions are delivered to the user's device over the network. As a result, the user can experience relatively quicker response from the device when loading a set of questions from the question bank and network traffic can be reduced.

Further, the techniques discussed herein, by using a natural language processor to generate keywords dynamically can improve the accuracy of the keywords compared to manually generated keywords. This improvement in accuracy can, in turn, improve the quality of media retrieved by the quiz app. That is, the media retrieved by the quiz app based on the keywords generated by the natural language processor can be more relevant than the media retrieved by the quiz app based on manually generated keywords. As the quiz app reduces the amount of non-relevant or less relevant media being retrieved, the memory usage at the user device as well as network traffic associated with the non-relevant or less-relevant media is reduced. The reduction in memory usage can improve the speed, power consumption and the cost of the user device, while reduction in network traffic can improve bandwidth and speed of transmission of media over the network.

In addition, the techniques discussed herein can alleviate the need for the user to determine a level of specificity of a question prompt, the specificity of their knowledge gap, and to manually search and store media relevant to reducing their knowledge gap. Specifically, the natural language processor can determine keywords with a level of specificity that more closely captures the knowledge intended to be tested by the question prompt. The quiz app can aggregate the keywords from various question prompts that the user answered incorrectly and retrieve media related to those keywords. The user does not have to manually search and retrieve the media relevant to the user's knowledge gap, which can reduce the time taken by the user to retrieve relevant media.

In one aspect, the disclosure relates to a method. The method includes providing, on a user interface of a user device, a plurality of quiz objects, each quiz object including a question prompt belonging to one of a plurality of subject areas; receiving, on the user interface of the user device, one or more actions on one or more quiz objects of the plurality of quiz objects; responsive to the one or more actions, identifying a set of quiz objects from the plurality of quiz objects for which a respective action is an incorrect response; extracting, using a natural language processor, keywords from question prompts for at least one quiz object of the set of quiz objects; retrieving, from one or more media interfaces, information on media related to the keywords; providing, on the user interface of the user device, the information on the media related to the keywords.

Implementations may include one or more of the following features. The method where the natural language processor extracts keywords that are nouns. Retrieving information on the media includes using an application programming interface (API) associated with at least one media source to request information on media related to the keywords. The media includes at least one of videos and articles. The method may include: receiving, from the user interface on the user device, a user input indicating a number of quiz objects to provide on the user interface; and requesting, from a quiz database via a network, the plurality of quiz objects based on the user input. The method may include: randomizing an order of the plurality of quiz objects prior to providing the plurality of quiz objects on the user interface. The information on media related to the keywords includes at least one of a title, a universal resource locator (URL), or an image. The method may include: recording, in a plurality of user-answer objects, actions associated with corresponding plurality of quiz objects; and generating, by the user device, a performance metric based on the actions recorded in the plurality of user-answer objects.

One general aspect includes one or more non-transitory computer-readable storage media storing instructions that when executed by one or more processors cause the one or more processors to perform operations. The operations can include providing, on a user interface of a user device, a plurality of quiz objects, each quiz object including a question prompt belonging to one of a plurality of subject areas; receiving, on the user interface of the user device, one or more actions on one or more quiz objects of the plurality of quiz objects; responsive to the one or more actions, identifying a set of quiz objects from the plurality of quiz objects for which a respective action is an incorrect response; extracting, using a natural language processor, keywords from question prompts for at least one quiz object of the set of quiz objects; retrieving, from one or more media interfaces, information on media related to the keywords; providing, on the user interface of the user device, the information on the media related to the keywords.

Implementations may include one or more of the following features. The computer-readable storage media where the natural language processor extracts keywords that are nouns. Retrieving information on the media includes using an application programming interface (API) associated with at least one media source to request information on media related to the keywords. The media includes at least one of videos and articles. The computer-readable storage media, where the operations may include: receiving, from the user interface on the user device, a user input indicating a number of quiz objects to provide on the user interface; and requesting, from a quiz database via a network, the plurality of quiz objects based on the user input. The computer-readable storage media, where the operations may include: randomizing an order of the plurality of quiz objects prior to providing the plurality of quiz objects on the user interface. The information on media related to the keywords includes at least one of a title, a universal resource locator (URL), or an image. The computer-readable storage media, where the operations may include: recording, in a plurality of user-answer objects, actions associated with corresponding plurality of quiz objects; and generating, by the user device, a performance metric based on the actions recorded in the plurality of user-answer objects.

One general aspect includes a system. The system also includes one or more processors; and one or more storage devices storing instructions that when executed by the one or more processors cause the one or more processors to perform operations. The operations may include: providing, on a user interface of a user device, a plurality of quiz objects, each quiz object including a question prompt belonging to one of a plurality of subject areas; receiving, on the user interface of the user device, one or more actions on one or more quiz objects of the plurality of quiz objects; responsive to the one or more actions, identifying a set of quiz objects from the plurality of quiz objects for which a respective action is an incorrect response; extracting, using a natural language processor, keywords from question prompts for at least one quiz object of the set of quiz objects; retrieving, from one or more media interfaces, information on media related to the keywords; providing, on the user interface of the user device, the information on the media related to the keywords.

Implementations may include one or more of the following features. The system where the natural language processor extracts keywords that are nouns. Retrieving information on the media includes using an application programming interface (API) associated with at least one media source to request information on media related to the keywords. The media includes at least one of videos and articles. The system, where the operations may include: receiving, from the user interface on the user device, a user input indicating a number of quiz objects to provide on the user interface; and requesting, from a quiz database via a network, the plurality of quiz objects based on the user input. The system, where the operations may include: randomizing an order of the plurality of quiz objects prior to providing the plurality of quiz objects on the user interface. The information on media related to the keywords includes at least one of a title, a universal resource locator (URL), or an image. The system, where the operations may include: recording, in a plurality of user-answer objects, actions associated with corresponding plurality of quiz objects; and generating, by the user device, a performance metric based on the actions recorded in the plurality of user-answer objects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows a block diagram depicting an NLP 500 extracting keywords from a question prompt.

FIG. 7 shows a flow diagram of an example process.

Like reference numbers and designations in the various drawings indicate like elements.

DETAILED DESCRIPTION

Figure 1:
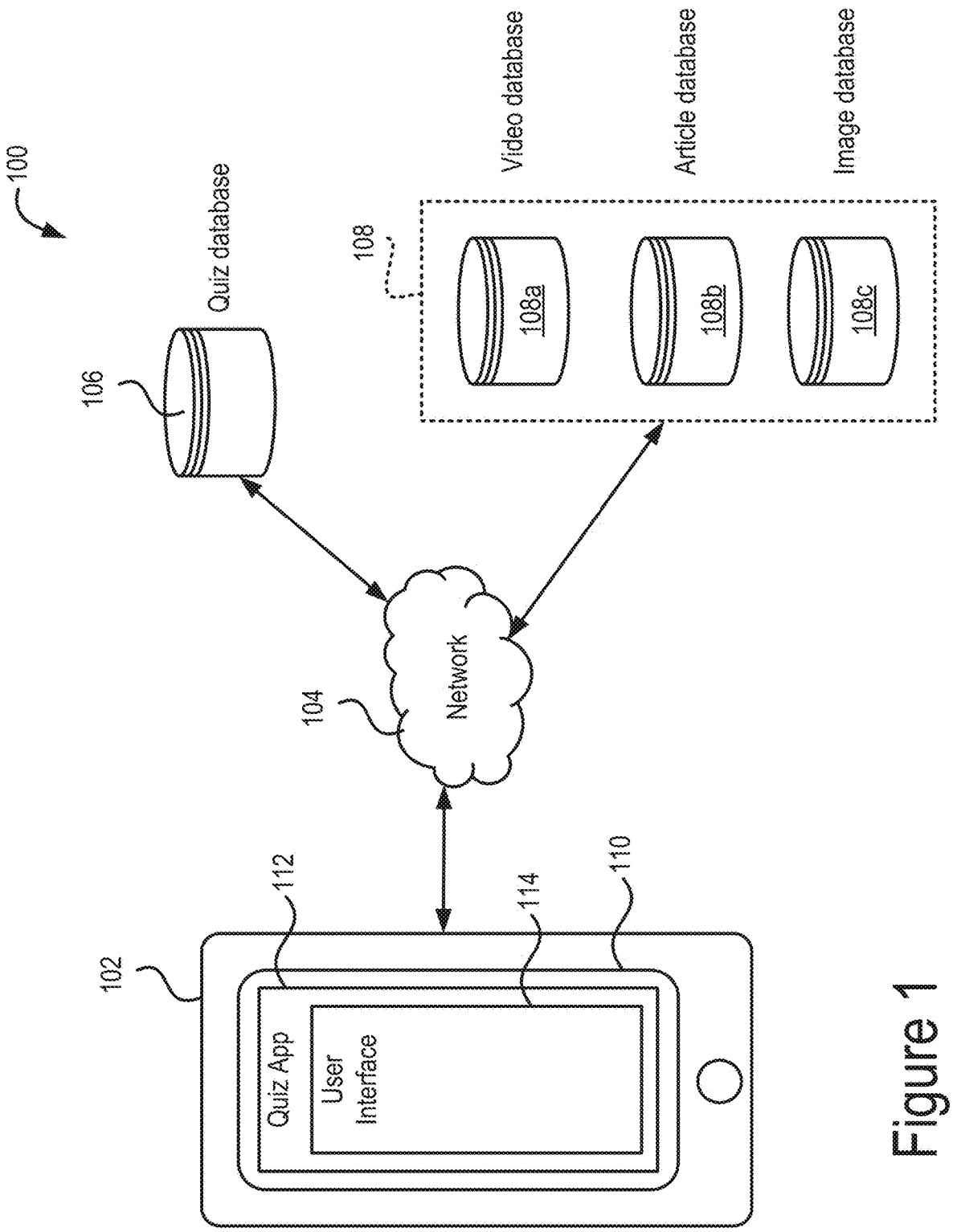
FIG. 1 is a block diagram of an example computing system.

FIG. 1 shows a block diagram of an example system 100 for supporting a quiz application. In particular, the example system 100 includes a user device 102, a network 104, a quiz database 106, a video database 108a, an article database 108b, and an image database 108c (collectively referred to as media database 108). The user device 102 can include desktop computers, laptop computers, smartphones, tablets, virtual reality (VR) headsets or other mobile computing devices. The user device 102 can include a touchscreen display 110 that allows a user to provide input to the user device 102 by touching the display 110. Of course, this is only one example, and in other examples, the display 110 could be a non-touchscreen display and the user device 102 can include a keyboard and/or a mouse (or tracker) to receive user input. The display 110 shows a quiz app 112 that has been launched on the user device 102. The quiz app can include a user interface 114 that can be used to interact with the user. As discussed below, the user interface 114 can provide quiz objects to the user, where the quiz object can include one or more question prompts and may also include answer choices. The user can interact with the quiz objects by taking one or more actions on the quiz objects. The actions can include, for example, selecting an answer choice from multiple answers choices, writing an answer in a text field in the user interface 114, selecting images or media, etc.

The quiz app 112 can request quiz objects from the quiz database 106. The quiz database 106 can include, for example, a relational database or a NoSQL database. The quiz database 106 can be installed on a server or in a cloud storage service. The quiz database 106 can store quiz data structures (also referred to as "quiz objects") that can include fields such as a question prompt, a set of answers, explanations, citations, images, videos, text, level of difficulty, and a subject identifier. The quiz app 112 can request one or more quiz data structures from the quiz database 106. For example, the quiz app 112 can query the user for one or more of: a number of questions in the quiz, the subject matter, the level of difficulty, etc. Based on the user's response to the query, the quiz app 112 can request the quiz database 106 to provide a specified number of quiz data structures.

The media database 108 can store media such as videos, articles, images and the like. The media database 108, like the quiz database 106, can also include, for example, a relational database or a NoSQL database. The media database 108 (including the video database 108a, the article database 108b, and the image database 108c) can be installed on one or more servers and/or in a cloud storage service. In some instances, the media databases can be third party databases which can provide media in response to a search query. Examples, of such media databases can include YouTube, PubMed, etc.

Figure 2:
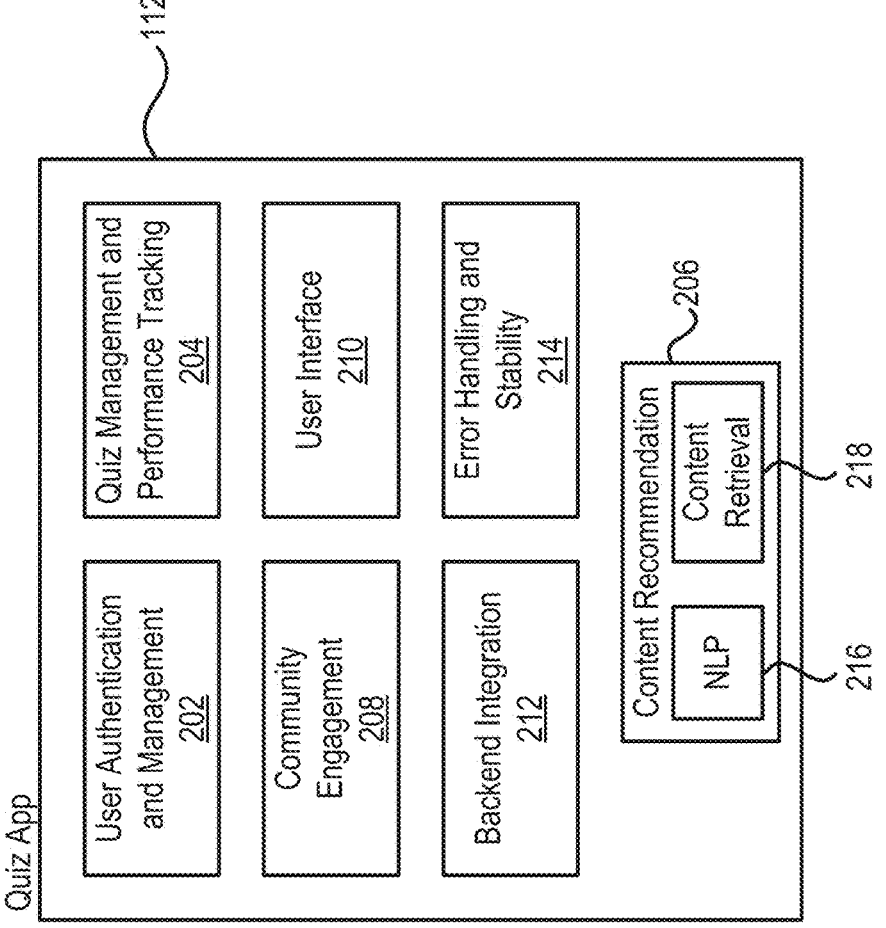
FIG. 2 shows an example architecture of a quiz app.

FIG. 2 shows an example architecture 200 of a quiz app. The example architecture 200 can be used, for example, to implement the quiz app 112 discussed herein in relation to FIG. 1. The example architecture 200 includes a user authentication and management engine 202, a quiz management and performance tracking engine 204, a community engagement engine 208, a user interface 210, a backend integration engine 212, an error handling and stability engine 214, and a content recommendation engine 206, which, in turn, can include a natural language processor (NLP) 216 and a content retrieval engine 218.

The user authentication management engine 202 can authenticate the user of the quiz app 112. In some examples, the user authentication management engine 202 can include an authentication function. An example authentication function can include a cryptographic algorithm such as a hash function that can hash the user login information and compare the hashed value with a stored value to authenticate the user. In some other examples, the quiz app 112 can invoke third party authentication platforms such as Firebase Authentication. With Firebase Authentication, the user can login to the quiz app 112 with the credentials that the user has for another account. For example, the Firebase Authentication can allow logging into the quiz app 112 based on the user authentication on the user's Gmail or Apple account. Once the user authenticates via the user's account, the user's account can generate a token (e.g., an identityToken generated by an Apple account), which is provided to the quiz app 112. The quiz app 112 can verify the token with a stored token associated with the user on Firebase (e.g., stored on Cloud Firestore database offered on the Firebase platform). Once the user is authenticated, the quiz app 112 can request user data stored on Firebase, where the user data may include the name, email, and profile picture associated with the user.

The authentication management engine 202 can also execute session management. For example, the authentication management engine 202 can store the authenticated state in the device operating system storage (e.g., @AppStorage on iOS) to ensure that the user remains logged in after closing and reopening the quiz app 112.

The authentication management engine 202 can also ensure that the Firebase platform successfully responds only to a quiz app installed on a user device and rejects communications from other apps. In one approach, the quiz app 112 can use App Check provided on the Firebase platform, where App Check prevents unauthorized clients from accessing backend resources. With App Check, the user device running the quiz app 112 can use a device attestation provider that attests to one or both of: (i) the requests originate from the authentic quiz app and (ii) requests originate from an authentic and untampered device. When the quiz app 112 accesses backend resources (e.g., the Cloud Firestore database), the quiz app will attach the attestation with every request. The App Check at the Firebase platform can accept only those requests that are received with an attestation. Attestation providers can include DeviceCheck or App Attest on the iOS devices, Play Integrity on the Android devices, and reCAPTCHA Enterprise on web apps.

The quiz management and performance tracking engine 204 (also referred to as "the quiz management engine 204") manages administration of a quiz on the quiz app 112 and tracks the performance of the user on the quiz. The quiz management engine 204 can fetch questions from storage and provide the questions to the user on the user device 102. In some examples, the questions can be stored in the form of a quiz object, where the quiz object can be a data structure including fields such as a question prompt, a set of answers, explanations, citations, images, videos, text, level of difficulty, and a subject identifier.

Figure 3:
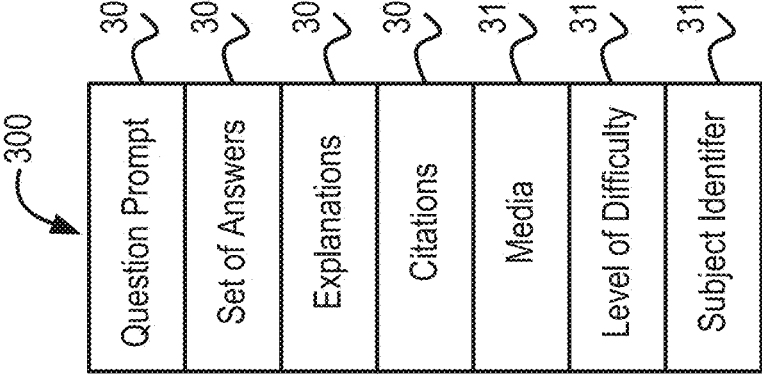
FIG. 3 shows an example quiz object data structure.

FIG. 3 shows an example quiz object data structure 300. The quiz object data structure 300 can include fields such as the question prompt 302, set of answers 304, explanations 306, citations 308, media 310, level of difficulty 312, and subject identifier 314. It should be noted that the quiz object data structure 300 may have fewer fields or additional fields (e.g., a question ID field) than that shown in FIG. 3. The question prompt 302 can include the question on which the user is being tested. As an example, the question prompt 302 can include "A 15M presents with acute, severe right wrist pain after a fall onto an outstretched hand while playing in the park with friends. An X-ray of the wrist is shown above. What is this fracture pattern?" The set of answers field 304 can include answer choices associated with the question prompt. In examples where the user is presented multiple choice questions, the set of answers can include two or more answer choices, which are presented to the user. In other examples where the user types in an answer, the set of answers field 304 can include the answer, which can be compared to the answer entered by the user. The explanations field 306 can include explanations of one or more answers. The citations field 308 can include text that identifies citations to literature related to the question prompt. The media field 301 can include image or video data that accompanies the question prompt. For instance, the example question prompt discussed above, the question refers the user to an X-ray image. Data of such an image can be included in the media field 310. In situations where the question prompt refers to a video, the media field can store data related to the video. The media field 310 can include data that can be used to render the media on the user interface, or can include links to the media, which can be retrieved from the links and presented to the user. The level of difficulty field 312 can include a number, text, a combination of number and text, or other data that can indicate the level of difficulty of the question prompt. The request to the database where the quiz objects are stored can include a level of difficulty parameter. The database can compare the level of difficulty in the request with the level of difficulty in the level of difficulty field 312 to retrieve the appropriate quiz objects and provide them to the quiz app 112. The subject identifier field can include data indicating the subject area of the question prompt. As an example, the subject area field 314 can include the text "orthopedics" in relation to the question prompt example discussed above. In this case as well, the database can compare the subject area of the quiz object with the subject area included in the request to retrieve the appropriate quiz objects to be provided to the quiz app 112.

The quiz management engine 204 can query the user for quiz parameters, which can include, for example, number of questions, subject area, difficulty level, type (e.g., multiple choice), etc. For example, the quiz management engine 204 can query the user for the quiz parameters on the user interface 114, where the user can select the values of the parameters. Once the selection is made, the quiz management engine 204 can generate a request (e.g., in JSON format) that includes values such as "5" for the number of questions, "cardiology" for the subject area, "high" for the difficulty level, and "multiple choice" for the type. The request can be sent to the quiz database 106, which can select the quiz objects based on the values of the parameters in the request. In some instances, the quiz database 106 may be local to the user device 102. For example, the quiz database can be located in the non-volatile memory of the user device 102. In such instances, the quiz management engine 204 can select the question objects from the quiz database based on the values of the parameters selected by the user.

In some examples, the quiz management engine 204 can randomize the order of the quiz objects before being provided to the user on the user interface 114. For instance, if the user requested a quiz with 10 questions, the quiz management engine 104 (or the quiz database 106) can randomly select 10 quiz objects from the n quiz objects that meet the quiz parameters. Thus, the quiz is dynamically created, with each quiz potentially including one or more different questions from the previous quiz with the same subject area. In some examples, the quiz management engine 204 can randomly order the answer choices for one or more questions before providing the question on the user interface 114.

The quiz management engine 204 also can track the answers provided by the user to the quiz. For example, the quiz management engine 204 can store user responses as UserAnswer objects, where the UserAnswer object can be a data structure that can include fields such as question id, user answer, subject area, correct/incorrect answer, etc. The quiz management engine 204 can generate the UserAnswer objects for each question answered by the user. For example, for the 10 questions provided to the user in the quiz, the quiz management engine 204 can generate respective 10 UserAnswer objects. In some examples, the quiz management engine 204 can generate the UserAnswer objects as the user is answering questions on the user interface 114. In some other examples, the quiz management engine 204 may generate the UserAnswer objects after the user has completed taking the quiz. The user interface 114 can provide the user selections to the quiz management engine 204.

Figure 4:
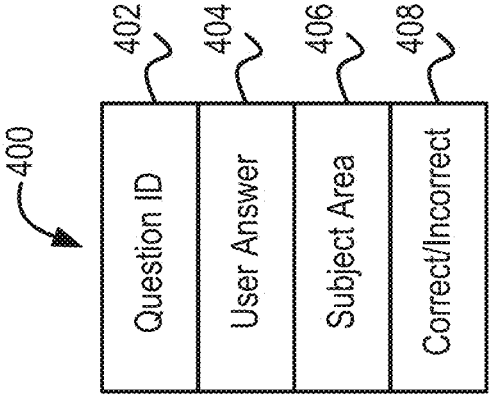
FIG. 4 shows an example UserAnswer object data structure.

FIG. 4 shows an example UserAnswer object data structure 400. The UserAnswer object data structure can include fields such as a question ID field 402, a user answer field 404, a subject area/identifier field 406, and a correct/incorrect answer indicator field 408. The question ID field can include an identifier (e.g., 1234) including text and or images that identifies the question. The user answer field 404 can include the answer choice of the user or the text entered by the user when answering the question. The user interface can provide information of the answer choice selected by the user, which information can be used by the quiz management engine 204 to fill the user answer field 404. The subject area field 406 can be similar to the subject identifier field discussed in relation to the quiz object data structure 300 shown in FIG. 3. The correct/incorrect answer indicator field 408 can include data that indicates whether the user answered the question correctly or incorrectly. The data stored in this filed can be as simple as a binary bit to indicate correct or incorrect answer. Of course, the field could include text that indicates correct or incorrect answer by the user or indicating that the user left the question unanswered.

The quiz management engine 204 can use the data provided by the user interface to generate the UserAnswer objects for each question on the quiz. As an example, a UserAnswer object can include the value "1234" for the question ID, a value "B" for the user answer, the value "cardiology" for subject area, and "correct" for correct/incorrect answer indicator field. In some examples, the quiz management engine 204 can generate UserAnswer objects for questions unanswered by the user. In such instances, the quiz management engine 204 can save the value "unanswered" for the user answer field and the correct/incorrect answer field.

The quiz management engine 204 can determine a performance of the user after the user has finished taking the quiz. In some instances, the user may select an option on the user interface to end the quiz after answering one or more questions. Selecting the option can invoke the quiz management engine 204 to determine the performance of the user. The quiz management engine 204 can determine the user performance, in part, by determining the total number of questions for which the user answers were correct. For example, the quiz management engine 204 can determine the total number of UserAnswer objects generated while the user was taking the quiz. The total number of UserAnswer objects can indicate the total number of questions in the quiz. The quiz management engine 204 also can aggregate the total number of "correct" values in the correct/incorrect answer indicator fields of the UserAnswer objects. The quiz management engine 204 can generate statistics from the values in the UserAnswer objects. For example, the quiz management engine 204 can determine the average percentage score for the user over the current and any previous quizzes on the same subject area.

In some examples, the quiz management engine 204 can also store the time taken by the user for each question or for the entire quiz. The quiz management engine 204 or the user interface 114/210 can start a timer when a question is provided to the user on the user interface and determine the duration until the user answered the question. In some examples, the quiz management engine 204 or the user interface 114/210 can call a timer function provided by the API of the operating system (e.g., Timer object in API level 1 of the Android operating system). The quiz management engine 204 can generate the UserAnswer object with a field 'time' that includes as a value the time taken by the user to answer the question. The quiz management engine 204 can generate performance statistics based also on the values of the time field in the UserAnswer objects.

The quiz management engine 204 can store the UserAnswer objects, the quiz objects, and the generated performance data locally on the device or to an offline storage. For example, the quiz management engine 204 can store the data in Core Data storage provided by the iOS, or store the data to the Cloud Firestore available on the Firebase platform. The quiz management engine 204 can update this data as the user completes new quizzes.

The content recommendation engine 206 can recommend media to the user based on the performance of the user on the quizzes. For example, the content recommendation engine 206 can access the performance data generated by the quiz management engine 204 to determine the weakest subject of the user. Typically, the weakest subject of the user can be the one for which the user has the lowest percentage of correct answers. However, the content recommendation engine 206 can also incorporate the time taken to answer the questions as another variable to determine the weakest subject of the user. In some other examples, the content recommendation engine 206 may recommend media based on more than one weakest subjects. In yet other examples, the user interface 114/210 can allow the user to select the subject area for which the user would like media recommendations.

The content recommendation engine 206 can include the NLP 216 to determine keywords that will be used for searching media for recommendation. In some examples, the NLP 216 can be an NLP inference engine. The NLP 216 can be implemented with NLP models such as GPT, BERT, etc., in instances where the user device has the computing resources to run the full-scale NLP models. For instances where the user device 102 is a mobile device or has limited computing resources to support the full-scale NLP model, optimized models such as DistilBERT, MobileBERT, ALBERT, TinyBERT, ONNZ, TensorFlow Lite, CoreML, etc., can be used to implement the NLP 216. The content recommendation engine 206 can also implement a framework for NLP inference, where the framework can include, e.g., TensorFlow, TensorFlow Lite (TFLite), ONNX Runtime, Core ML (for iOS), ML Kit (for Android OS), etc. These frameworks can support libraries that include keyword extractor functions that use an NLP model to carry out inference operations. For example, KeyBERT is a keyword extraction function that finds the most related keywords and key-phrases in a text.

The keyword extractor can be provided with a portion of text from the quiz object to identify keywords. For example, the content recommendation engine 206 can provide the question prompt, or a portion thereof (e.g., the first sentence of the question prompt), to the NPL 216. In some other examples, the content recommendation engine 206 can provide the text from the explanation of the answer, or a portion thereof, to the NLP 216. In some examples, content recommendation engine 206 can provide a combination of the abovementioned texts. The keyword extractor can convert words or phrases in the input text into high-dimension vectors called embeddings. For example, using a model such as BERT, embeddings capture the meaning of words based on the surrounding text. The keyword extractor can utilize techniques such as cosine similarity or other clustering methods to identify the most important words in the text. In some examples, the keyword extractor can utilize these techniques to identify nouns in the text. The keyword extractor can return a list of extracted words, which can be used by the content recommendation engine 206 to search for media.

FIG. 5 shows a block diagram depicting an NLP 500 extracting keywords from a question prompt. The NLP 500 can be an implementation of the NLP 216 discussed above in relation to FIG. 2. The content recommendation engine 205 can provide as input data from the quiz objects that the user answered incorrectly. In the example shown in FIG. 5, the content recommendation engine 205 provides the question prompt of a quiz object that has an indication of the user answering incorrectly. In some instances, the input to the NLP 500 may include data other than or in addition to the question prompt. For example, the data input to the NLP 500 may include portions or entirety of the answer choices, the explanations, the citations, and the subject area/identifier. The NLP 500 (or specifically, e.g., the keyword extractor function of the NLP) generates a set of keywords related to the input. In the example shown in FIG. 5, the NLP 500 generates keywords such as "CHF," "COPD," "CKD," CAD," "shortness of breath," "nitroglycerin," and "pulmonary edema."

It should be noted that the quiz app 112 extracts keywords from the quiz objects dynamically. That is, the keywords are not extracted from tagged keywords that have been manually generated and statically stored with the quiz object. By eliminating the tagged keywords, the size of the quiz object in terms of memory storage can be reduced. The reduction in the size of the quiz objects, in particular where the question bank can include hundreds or thousands of questions and associated quiz objects, can considerably reduce the storage footprint of the quiz objects. In instances where at least a portion of the database that includes the quiz objects is stored on user's mobile device, which can have limited storage capacity, the reduction in the size of the quiz objects can reduce the burden on storage resources of the mobile device. In addition, the reduction in the size of the quiz objects can reduce the latency of the communication of the quiz objects from a remote database to the user device and reduce network traffic.

Referring again to FIG. 2, the content retrieval engine 218 can search and retrieve media based on the keywords extracted by the NLP 216. As mentioned above, media can include videos, images, articles, webpages, etc. In some examples, the content retrieval engine 218 can search for videos on platforms such as YouTube, Vimeo, Dailymotion, etc. These video platforms typically provide an API that the content retrieval engine 218 can use search and retrieve videos. For example, YouTube API includes requests such as "list (keywords)", which return a collection of search results that match the keywords included in the requests. The content retrieval engine 218 can communicate the request to the media source and receive a list of video titles. In some examples, the content retrieval engine 218 can receive, in addition to the video titles, URLs of the videos, brief description of the videos, length of the videos, channel identity, etc. The content retrieval engine 218 can receive this information and provide the information to the user interface, which, in turn, can display the information to the user. The content retrieval engine 218 also can request articles from sources such as PubMed and LITFL.com. In some such instances, the content retrieval engine 218 can use the API commands associated with the respective media source to search and retrieve information on media related to the keywords.

In some examples, the content retrieval engine 218 can rearrange, alter, or amend the results received from the media source. The content retrieval engine 218 can reorder the list of media received from the media source based on relevance. The content retrieval engine 218 may also web scrape the media source to gather specific information about the results such as article titles, URLs and associated images. This can be particularly advantageous where the media source may not provide data in certain formats such as JSON, XML, etc. The scraped data can be amended to the result received from the media source to provide additional information to the user.

The content retrieval engine 218 can provide the results to the user interface 210, which can present the results to the user on the display of the user device. In some examples, the user interface 210 can present the results in a "READ" tab. The user interface 210 can allow the user to scroll up and down the tab to view the list of results and play or view media such as videos, images or articles.

The community engagement engine 208 can support a chat or post platform over which multiple users can communicate. The community engagement engine 208 can manage the data exchange between the user interface, where the user enters information, and a backend that maintains and stores the messages sent and received by users. The community engagement engine 208 can use Websocket, Firebase, etc., for sending and receiving chat messages from the backend in real time. The backend can be implemented by setting up an express server for handling posts (e.g., express server using Firebase), user authentication (also using Firebase, for example), a database for real-time messaging and storing posts (e.g., Firestore provided by Firebase), and enabling WebSocket for real-time updates. A user can create posts based on quiz questions and explanations and can add additional comments for public discussion. The posts can include text and media (e.g., videos, images, etc.) and the community engagement engine 208 can prioritize video explanations over related videos, which, in turn, can be prioritized over images. The community engagement engine 208 can also provide the capability of allowing users to block other users or flag inappropriate posts, record these actions in the database for further review by an administrator.

The user interface 210, as mentioned above, can interact with the user to receive and input information. In particular, the user interface 210 can interact with the user authentication and management engine 202, the quiz management engine 204, the content recommendation engine 206, and the community engagement engine 208 to present respective information to the user. For example, the user interface 210 can receive a login page where the user can input their credentials to log in to the quiz app 112. The user interface 210 can receive the credentials entered by the user and provide the credentials to the user authentication and management engine 202. Once the user is logged in, the user interface 210 can receive quiz and performance information from the quiz management engine 204. The user interface 210 can receive inputs from the user (e.g., selection of answers for the quiz questions) and provide the inputs to the quiz management engine 204. The user interface 210 can also receive information in response form the quiz management engine 204, where the information can include the next question, or an explanation. The user interface can include tabs that can be selected by the user, where the tabs can include a Home tab, a Post tab, and a Read tab. On the Home tab, the user interface 210 can display average quiz scores, weakest subject, and other performance metrics with dynamic charts. On the Post tab, the user interface 210 can display community engagement data such as posts from other users. In the Read tab, the user interface 210 can provide data gathered by the content recommendation engine 206, where the data can include articles, videos, or other media related to the quiz performance of the user.

The backend integration engine 212 can allow the quiz app 112 to interact with backend servers and databases. For example, the backend integration engine can generate requests (e.g., REST API calls, JSON) to a central database (e.g., Firestore) for storing user data, quiz results, posts, and other user interactions. The backend integration engine 112 can also communicate with cloud storage services (e.g., AWS) to store and retrieve large media files such as videos and images. The backend integration engine 212 can also communicate with local storage on the user device where performance-critical data such as quiz questions and user answers can be stored.

The error handling and stability engine 214 can handle errors in the list of media retrieved by the content recommendation engine 206. For example, missing videos or articles can be skipped dynamically to ensure uninterrupted user flow.

Figures 6A, 6B, 6C:
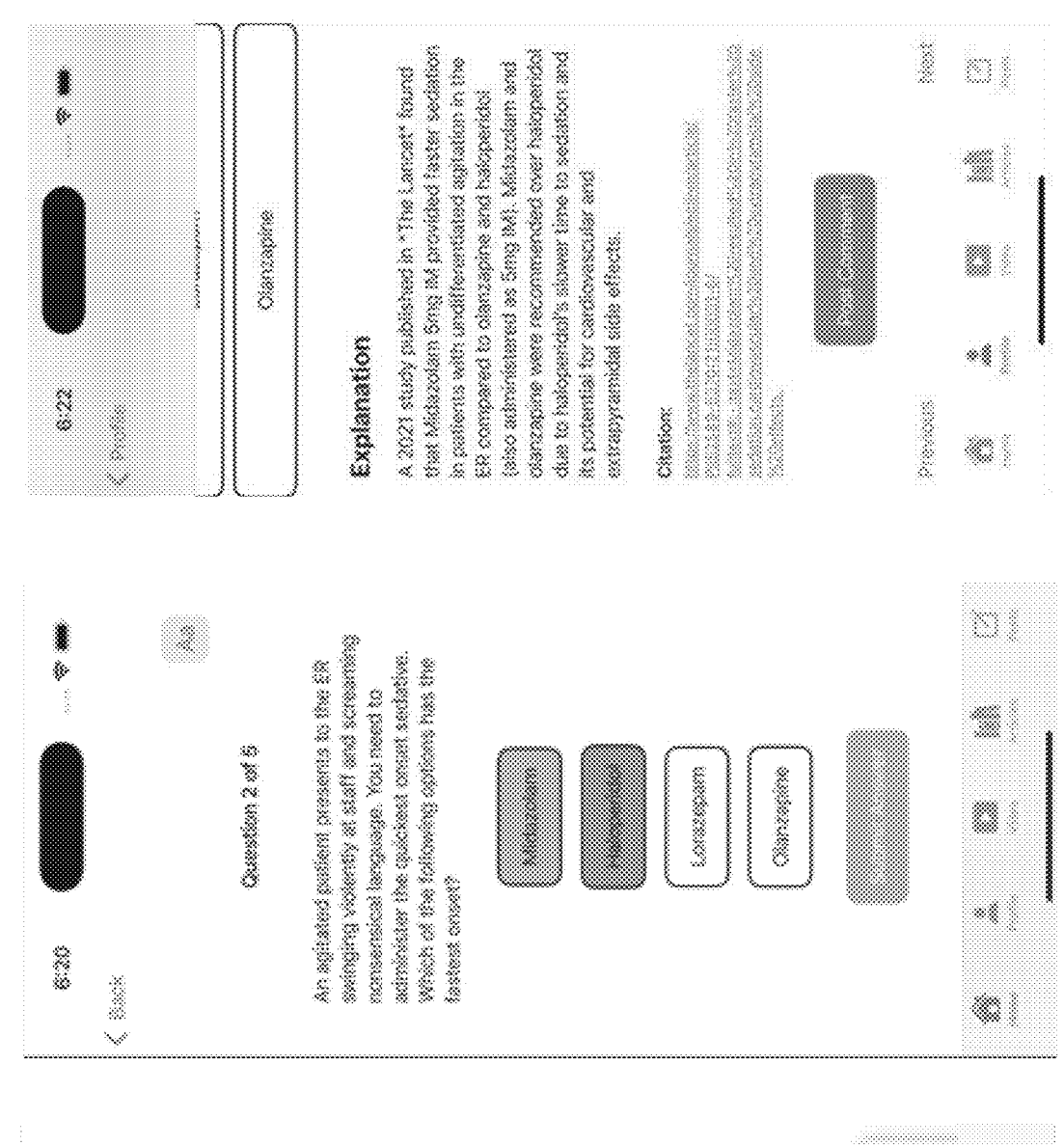
FIGS. 6A-6E show screenshots of example user interfaces at various stages of the operation of the quiz app.
Figure 6E:
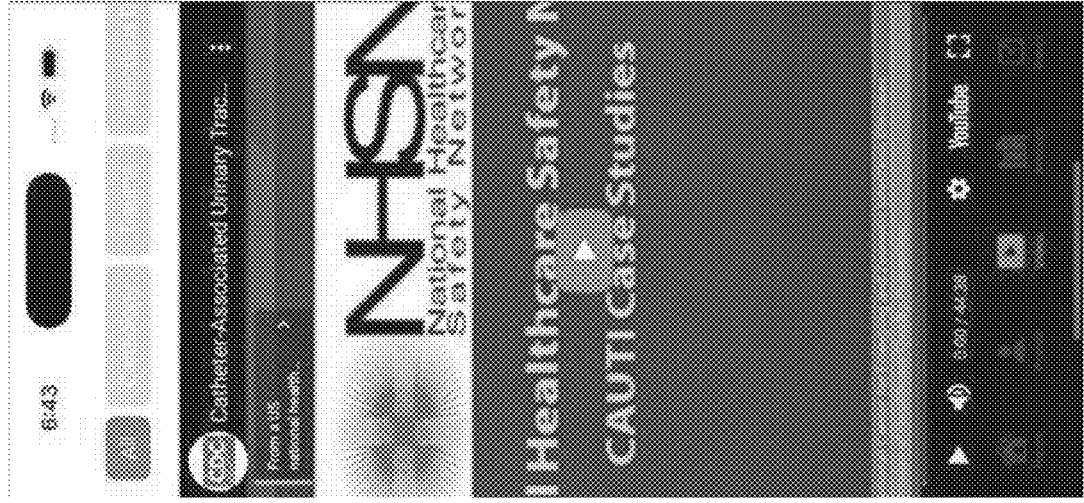
Figure 6D:
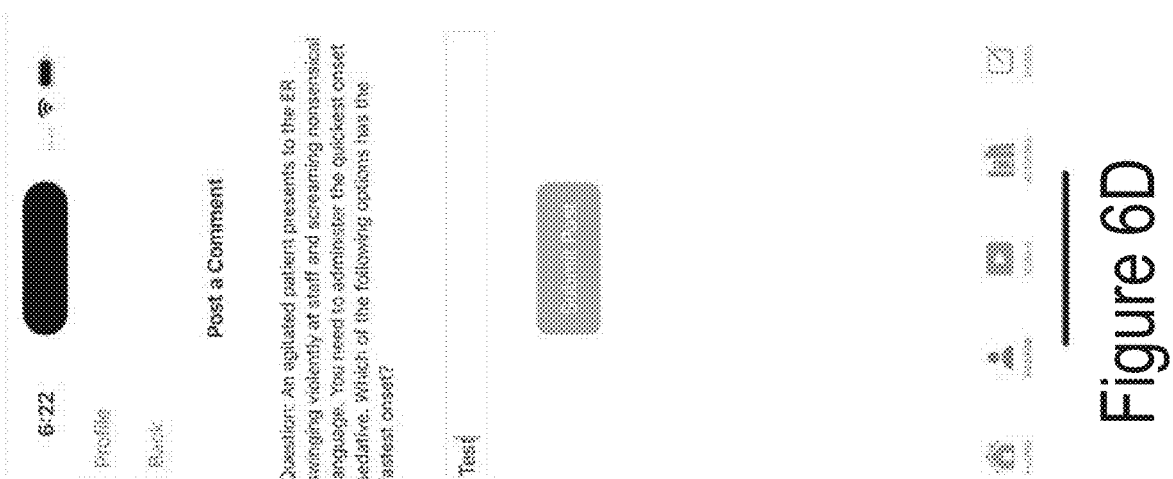

FIGS. 6A-6E show screenshots of example user interfaces at various stages of the operation of the quiz app. In particular, FIG. 6A shows an example user interface of a quiz dashboard, FIG. 6B shows an example user interface of a question prompt presented to the user along with answer choices, FIG. 6C shows an example user interface where the quiz app presents answer explanations to the user, FIG. 6D shows an example interface to allow the user to post a comment on a question, and FIG. 6E shows an example user interface where the user is presented media retrieved from media sources.

FIG. 6A shows a dashboard where the user is presented with the user's performance on past quizzes as well as options to select parameters. The quiz management engine 204 can provide the user interface engine 210 with the user's performance statistics for display on the user interface. The user interface can also display the option of selecting the number of questions that that the user would like the quiz to include. The user interface may further provide the user with the option to prioritize the weakest category. Upon selection of this option, the user interface engine 210 can indicate to the quiz management engine 204 that the user as selected the option of prioritizing the weakest category. The quiz management engine 204 can order the list of questions provided to the user such that the questions related to user's weakest subject area appear before questions related to other subject areas. The user interface engine 210 can communicate the number of questions selected by the user. The quiz management engine 204, in response, can access the quiz database to retrieve a number of questions indicated by the user.

FIG. 6B shows an interface where the user is presented with a questions prompt along with answer choices. The quiz management engine 204 can provide the user interface engine 210 with the question prompt and the answer choices based on the quiz object associated with that question prompt. The user interface engine 210 makes the answer choices selectable such that the user can indicate their answer. Once the user selects an answer choice, the user interface engine 210 can communicate the selected answer choice to the quiz management engine 204, which, in turn, can generate UserAnswer objects and statistics.

FIG. 6C shows a user interface where the user is presented with an answer explanation. As mentioned in relation to FIG. 3, the quiz object can include answer explanations associated with each answer choice. The user, for a answer choice, can indicate to view an explanation of the answer choice. The user interface engine 210 can communicate this indication to the quiz management engine 204, which in turn can retrieve the explanation of the selected answer choice from the quiz object and communicate the explanation to the user interface engine 210 for display to the user.

FIG. 6D shows a user interface where the user can post a message on a chat or post platform. The user can select on the user interface related to a question prompt a "post" button, for example, to indicate that the user would like to post a message related to the question. The user interface engine 210 can communicate the user selection to the community engagement engine 208, which in turn can provide the user interface engine 210 with a user interface to present to the user on which the user can enter a message related to the question. Once the user enters the message, the user interface engine 210 can communicate the message to the community engagement engine 208, which can communicate the message to the backend (e.g., an express server for handling posts).

FIG. 6E shows a user interface that displays media to the user. In particular, the user interface engine 210 can receive media or links to media from the content retrieval engine 218 and display the media or links to the user. In FIG. 6E, the user has selected a video retrieved by the retrieval engine 218, and the user interface engine 210 can play the video within the quiz app. The user interface engine 210 can include the capability to display media (video, image, audio, text, etc.) within the quiz app so that the user does not need to exit the quiz app to access the media.

FIG. 7 shows a flow diagram of an example process 700. The process 700 can be implemented on a user device such as the user device 102 shown in FIG. 1. The process 700 can also be generally implemented on the computing system shown in FIG. 7. In some examples, the process 700 can be executed on a combination of devices and computing systems such as, and not limited to, the user device 102 shown in FIG. 1 and the computing system shown in FIG. 7. The process 700 includes providing, on a user interface of a user device, a plurality of quiz objects, each quiz object including a question prompt belonging to one of a plurality of subject areas (702). At least one example of this process step has been discussed herein in relation to FIGS. 1-5. For example, as discussed in relation to the user interface 114, the quiz management engine 204 can provide a plurality of quiz objects for display on the user interface 114. The quiz objects can include a question prompt belonging to one or more subject area. The quiz object may also include a list of answers that can be selected by the user, or a text field for the user to type in an answer. As discussed herein in relation to FIG. 2, the quiz management engine 204 can fetch the quiz objects from storage and provide at least the quiz questions to the user on the user interface 114.

The process 700 also includes receiving, on the user interface of the user device, one or more actions on one or more quiz objects of the plurality of quiz objects (704). At least one example of this process step has been discussed herein in relation to FIGS. 1-5. For example, the user interface 114, which provides the question prompt to the user, can receive an action performed by the user. The one or more actions can include the user selecting a particular answer choice from the plurality of answer choices provided on the user interface in relation to the question prompt, or the user typing in the answer in a text field provided on the user interface. The user interface 114 can receive the one or more actions from the user and provide the one or more user actions to the quiz management engine 204.

The process 700 further includes responsive to the one or more actions, identifying a set of quiz objects from the plurality of quiz objects for which a respective action is an incorrect response (706). The quiz management engine 204 can identify from the one or more quiz objects from the set of quiz objects for which the user provided an incorrect answer. For example, if the quiz includes 10 questions, the quiz management engine 204 can determine, based on the one or more actions by the user, those questions for which the user selected an incorrect answer. The quiz management unit 204 identify the set of quiz objects by comparing the selection of (or entry of) the answers with an answer key that includes the correct answer choice for each question in the quiz.

The process 700 also includes extracting, using a natural language processor, keywords from question prompts for at least one quiz object of the set of quiz objects (708). As discussed in relation to FIGS. 2 and 5, the content recommendation engine 206 can extract keywords from the quiz objects for which the user answered incorrectly. For example, the quiz management engine 204 can provide the NLP 216 with a portion or entirety of the text of a question prompt for keyword identification. The quiz management engine 204 may provide the text of the question prompt to the NLP 216 one quiz object at a time, or provide collectively the text of all the question prompts for which the user answered incorrectly. The NLP 216 can utilize natural language processing to extract keywords that can identify the most important words or nouns in the text.

The process 700 further includes retrieving, from one or more media interfaces, information on media related to the keywords (710). As discussed herein in relation to FIG. 2, the content retrieval engine 218 can search and retrieve media based on the keywords extracted by the NLP 216. The content retrieval engine 218 can search and retrieve media such as videos, images, articles, etc., from one or more media source platforms.

The process 700 also includes providing, on the user interface of the user device, the information on the media related to the keywords (712). As discussed herein in relation to FIG. 2, the content retrieval engine 218 can retrieve a list of media related to the keywords extracted by the NLP 216. The content retrieval engine 218 can provide the retrieved list of media to the user via the user interface 114. The user interface can display the list of media on a separate tab (e.g., Media tab) to show the results to the user. In some instances, the user interface can have a tab or a subtab (e.g., under the Media tab) for each type of media such as a video tab, an article tab, and an image tab, and provide the media on each of the respective tabs.

The process may also include retrieving information using an API associated with at least one media source to request information on media related to the keywords. For example, the content retrieval engine 218 can use YouTube API to search and retrieve information on videos related to the keywords extracted by the NLP 216.

The process can also include receiving from the user interface, a user input indicating a number of quiz objects to provide on the user interface. For example, the quiz management engine 204 can present a question to the user on the user interface 114 for the number of questions that the user would like to be included in the quiz. The user interface 114 can provide the number of questions entered by the user to the quiz management engine 204, which, in turn, can request form a quiz database a number of quiz objects indicated by the user. The quiz objects can be stored in a local database on the user device or an external database that is communicably coupled with the user device via a communication network.

The process can also include randomizing an order of the plurality of quiz objects prior to providing the plurality of quiz objects on the user interface. In some examples, the quiz management engine 204 can change the order of the quiz objects as they are presented the user on the user interface each time the user requests a quiz. In some examples, the quiz management engine 204 can change the order of the quiz objects only if the user requests a quiz on a subject area for which the user has been quizzed previously. Changing the order or randomizing the quiz objects can reduce the risk that the user remembers the question from their previous quiz on the subject area.

The process can also include receiving information on the media related to the keywords including at least one of a title, a URL or an image. For example, the content retrieval engine 218 can retrieve form the media source platforms a link to a video, the title of the video and a thumbnail image representing the video. The content recommendation engine 206 can provide the list of the media to the user interface 114 for display to the user with the title, the URL and the thumbnail image of each video.

The process also includes recording, in a plurality of user-answer objects, actions associated with the corresponding plurality of quiz objects, and generating a performance metric based on the actions recorded in the user-answer objects. For example, the quiz management engine 204 can record the answer to a quiz object in a user-answer object that can include the identity of the quiz object that the user-answer object is associated with and the answer entered by the user. The quiz management engine 204 can aggregate the correct and incorrect answers from all the user-answer objects corresponding to the quiz objects. The quiz management engine 204 can then generate performance metrics such as correct answer percentage and provide the performance metrics to the user via the user interface 114.

Figure 8:
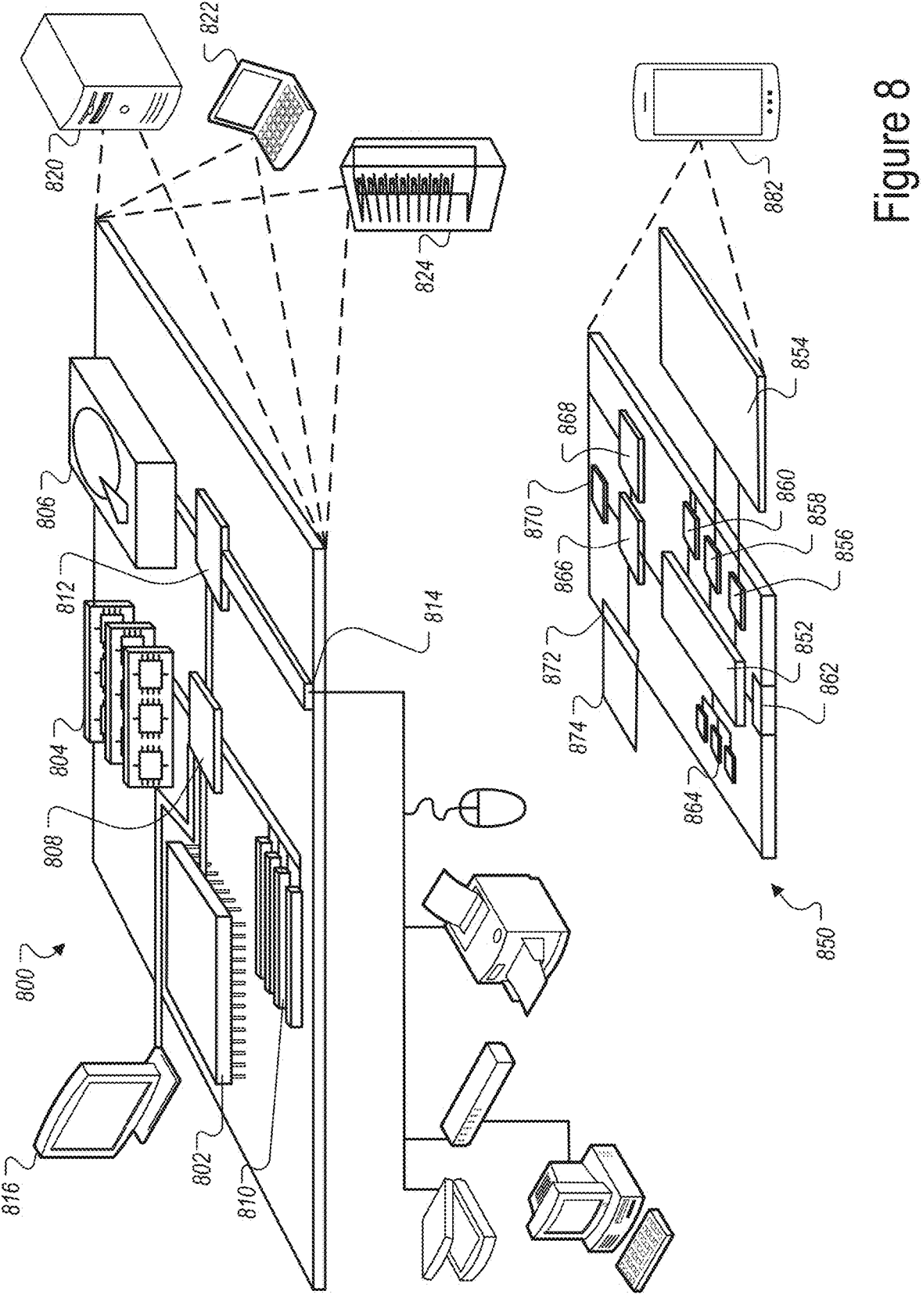
FIG. 8 is a block diagram illustrating an example computer system.

FIG. 8 is a block diagram illustrating an example computer system or device 800 that can be used in connection with methods and processes described in this specification. For example, computing devices 800, 850 may be used to implement the systems and methods described in this document, either as a client or as a server or plurality of servers. In some implementations, system 800 is an example hardware computing system for implementing one or more aspects of the quiz app 112 shown in FIG. 1. For example, the process 700 discussed in relation to FIG. 7 can be implemented and/or executed using system 800.

In the example of FIG. 8 computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low-speed interface 812 connecting to low-speed bus 814 and storage device 806. Each of the components

802, 804, 806, 808, 810, and 812, are interconnected using various busses, and may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low-speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850.

Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random-access memory or both. Some elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:

storing in memory, by a processor of a user device, a plurality of quiz object data structures absent one or more keywords associated with any of the quiz object data structures, each quiz object data structure comprising a question prompt belonging to one of a plurality of subject areas, wherein the one or more keywords comprise one or more words related to a subject area of the respective quiz object structure;

retrieving, by the processor from the memory of the user device, the plurality of quiz object data structures;

providing, by the processor on a user interface of the user device, data related to the plurality of quiz object data structures;

receiving, by the processor via the user interface of the user device, one or more actions on data related to one or more quiz object data structures of the plurality of quiz object data structures;

responsive to the one or more actions, identifying, by the processor, a set of quiz object data structures from the plurality of quiz object data structures for which a respective action is an incorrect response;

dynamically extracting, by the processor using a natural language processor, keywords from question prompts for at least one quiz object data structure of the set of quiz object data structures, wherein the natural language processor is configured to convert words or phrases in the question prompts into embeddings and identify, based on clustering the embeddings, one or more words or phrases as the keywords;

retrieving, by the processor from one or more media interfaces, information on media related to the keywords; and providing, by the processor on the user interface of the user device, the information on the media related to the keywords.

2. The method of claim 1, wherein the natural language processor extracts keywords that are nouns.

3. The method of claim 1, wherein retrieving information on the media comprises using an application programming interface (API) associated with at least one media source to request information on media related to the keywords.

4. The method of claim 1, wherein the media comprises at least one of videos and articles.

5. The method of claim 1, further comprising:

receiving, by the processor via the user interface on the user device, a user input indicating a number of quiz object data structures to provide on the user interface; and requesting, by the processor from a quiz database via a network, the plurality of quiz object data structures based on the user input.

6. The method of claim 5, further comprising:

randomizing, by the processor, an order of the plurality of quiz object data structures prior to providing data related to the plurality of quiz object data structures on the user interface.

7. The method of claim 1, wherein the information on media related to the keywords includes at least one of a title, a universal resource locator (URL), or an image.

8. The method of claim 1, further comprising:

recording, by the processor, in a plurality of user-answer object data structures, actions associated with corresponding plurality of quiz object data structures; and generating, by the processor of the user device, a performance metric based on the actions recorded in the plurality of user-answer object data structures.

9. The method of claim 1, wherein clustering the embeddings comprises performing, by the processor, cosine similarity clustering on the embeddings to identify one or more words or phrases as keywords.

10. One or more non-transitory computer-readable storage media storing instructions that when executed by one or more processors cause the one or more processors to perform operations comprising:

storing in memory, by a processor of a user device, a plurality of quiz object data structures absent one or more keywords associated with any of the quiz object data structures, each quiz object data structure comprising a question prompt belonging to one of a plurality of subject areas, wherein the one or more keywords comprise one or more words related to a subject area of the respective quiz object structure;

retrieving, by the processor from the memory of the user device, the plurality of quiz object data structures;

providing, by the processor on a user interface of the user device, data related to the plurality of quiz object data structures;

receiving, by the processor via the user interface of the user device, one or more actions on data related to one or more quiz object data structures of the plurality of quiz object data structures;

responsive to the one or more actions, identifying, by the processor, a set of quiz object data structures from the plurality of quiz object data structures for which a respective action is an incorrect response;

dynamically extracting, by the processor using a natural language processor, keywords from question prompts for at least one quiz object data structure of the set of quiz object data structures, wherein the natural language processor is configured to convert words or phrases in the question prompts into embeddings and identify, based on clustering the embeddings, one or more words or phrases as the keywords;

retrieving, by the processor, from one or more media interfaces, information on media related to the keywords; and providing, by the processor on the user interface of the user device, the information on the media related to the keywords.

11. The computer-readable storage media of claim 10, wherein the natural language processor extracts keywords that are nouns.

12. The computer-readable storage media of claim 10, wherein retrieving information on the media comprises using an application programming interface (API) associated with at least one media source to request information on media related to the keywords.

13. The computer-readable storage media of claim 10, wherein the media comprises at least one of videos and articles.

14. The computer-readable storage media of claim 10, comprising:

receiving, by the processor via the user interface on the user device, a user input indicating a number of quiz object data structures to provide on the user interface; and requesting, by the processor from a quiz database via a network, the plurality of quiz object data structures based on the user input.

15. The computer-readable storage media of claim 14, comprising:

randomizing, by the processor, an order of the plurality of quiz object data structures prior to providing data related to the plurality of quiz object data structures on the user interface.

16. The computer-readable storage media of claim 10, wherein the information on media related to the keywords includes at least one of a title, a universal resource locator (URL), or an image.

17. The computer-readable storage media of claim 10, comprising:

recording, by the processor, in a plurality of user-answer object data structures, actions associated with corresponding plurality of quiz object data structures; and generating, by the processor of the user device, a performance metric based on the actions recorded in the plurality of user-answer object data structures.

18. The computer-readable storage media of claim 10, wherein clustering the embeddings comprises performing, by the processor, cosine similarity clustering on the embeddings to identify one or more words or phrases as keywords.

19. A system, comprising:

one or more processors; and one or more storage devices storing instructions that when executed by the one or more processors cause the one or more processors to perform operations comprising:

storing in memory, by the one or more processor of a user device, a plurality of quiz object data structures absent one or more keywords associated with any of the quiz object data structures, each quiz object data structure comprising a question prompt belonging to one of a plurality of subject areas, wherein the one or more keywords comprise one or more words related to a subject area of the respective quiz object structure;

retrieving, by the one or more processors on a user interface of the user device, a plurality of quiz object data structures;

receiving, by the one or more processors via the user interface of the user device, one or more actions on data related to one or more quiz object data structures of the plurality of quiz object data structures;

responsive to the one or more actions, identifying, by the one or more processors, a set of quiz object data structures from the plurality of quiz object data structures for which a respective action is an incorrect response;

dynamically extracting, by the one or more processors using a natural language processor, keywords from question prompts for at least one quiz object data structure of the set of quiz object data structures, wherein the natural language processor is configured to convert words or phrases in the question prompts into embeddings and identify, based on clustering the embeddings, one or more words or phrases as the keywords;

retrieving, by the one or more processors, from one or more media interfaces, information on media related to the keywords; and providing, by the one or more processors, on the user interface of the user device, the information on the media related to the keywords.

20. The system of claim 19, wherein the natural language processor extracts keywords that are nouns.

21. The system of claim 19, wherein retrieving information on the media comprises using an application programming interface (API) associated with at least one media source to request information on media related to the keywords.

22. The system of claim 19, wherein the media comprises at least one of videos and articles.

23. The system of claim 19, comprising:

receiving, by the one or more processors via the user interface on the user device, a user input indicating a number of quiz object data structures to provide on the user interface; and requesting, by the one or more processors from a quiz database via a network, the plurality of quiz object data structures based on the user input.

24. The system of claim 23, comprising:

randomizing, by the one or more processors, an order of the plurality of quiz object data structures prior to providing the plurality of quiz object data structures on the user interface.

25. The system of claim 19, wherein the information on media related to the keywords includes at least one of a title, a universal resource locator (URL), or an image.

26. The system of claim 19, comprising:

recording, by the one or more processors, in a plurality of user-answer object data structures, actions associated with corresponding plurality of quiz object data structures; and generating, by the one or more processors of the user device, a performance metric based on the actions recorded in the plurality of user-answer object data structures.

27. The system of claim 19, wherein clustering the embeddings comprises performing, by the processor, cosine similarity clustering on the embeddings to identify one or more words or phrases as keywords.

* * * * *